May 7, 1929.  O. DREYER  1,711,634
THERMAL PROTECTIVE DEVICE
Original Filed Oct. 17, 1925
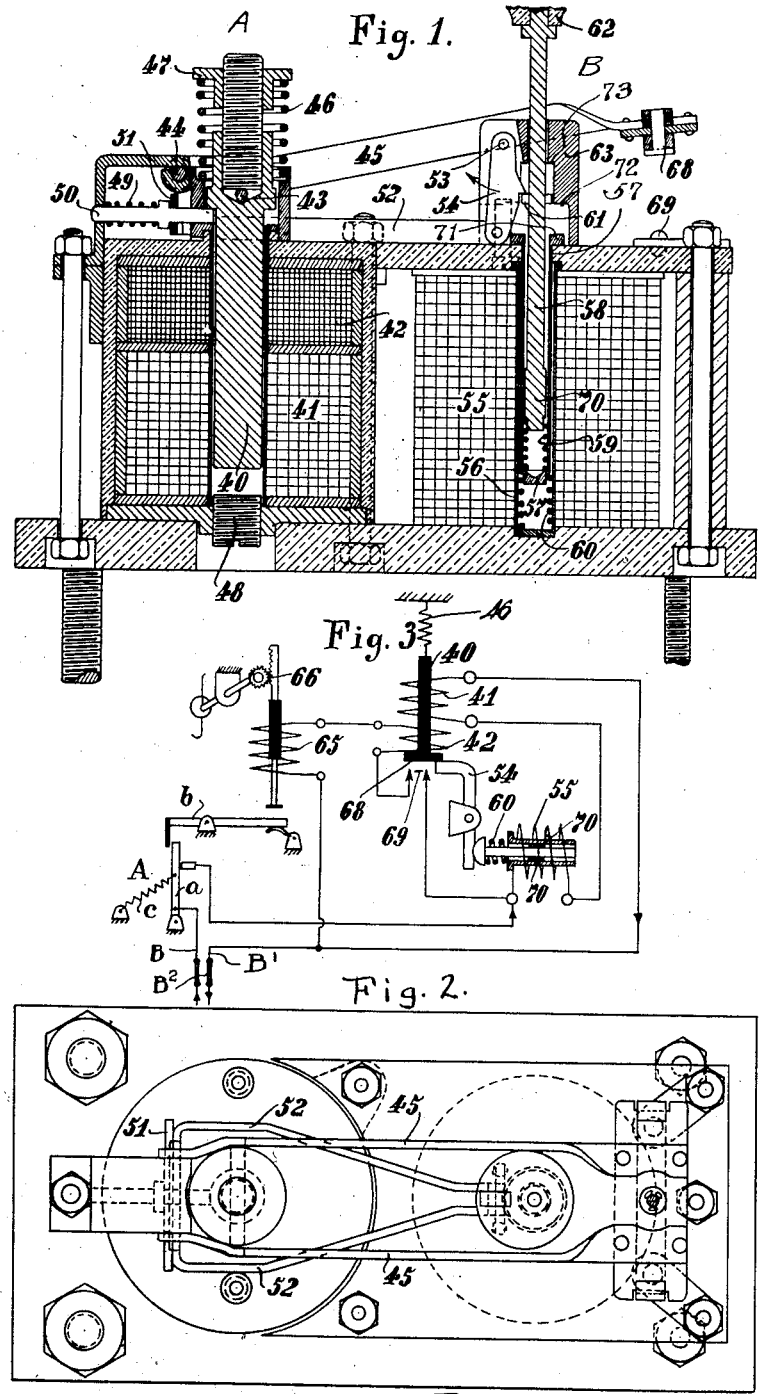
Otto Dreyer, Inventor;
by [signature]
his attorney Patented May 7, 1929.

1,711,634

UNITED STATES PATENT OFFICE.

OTTO DREYER, OF ESSEN, GERMANY.

THERMAL PROTECTIVE DEVICE.

Original application filed October 17, 1925, Serial No. 62,979, and in Germany October 20, 1924. Divided and this application filed April 29, 1926. Serial No. 105,396.

This application is a division of my prior application Serial No. 62,979, filed October 17, 1925.

The present invention relates to a thermal protective device for the circuits of electric motors and other electric circuits, in which an electromagnetic releasing device influenced by the current of the apparatus to be protected is kept locked by means of a soldered joint or similar thermal safety device until a definite temperature is exceeded. The object of the present invention to so construct the protective device that in spite of the soldered joint coming into action, that is, in spite of the limiting temperature being reached, it is possible to continue to run the motor with a reduced current which is consequently noninjurious to the motor.

For this purposes the winding of the releasing armature or the latter itself is so constructed that it does not come into action in the case of a load which is less than the normal load current by a certain amount, while it is at the same time connected with a time relay device, in order that transient overloads, which for example are unavoidable on starting, may exist without the circuit being switched off. Moreover, in order to be able to confine the attraction and falling away of the releasing armature to a restricted range of current, it is preferably so designed, in view of the fact that as is well known substantially more current is requisite for the bringing of the armature into action than for holding it, to provide the releasing magnet acting with a bucking coil which after the armature has come into action sends an opposing flux to the flux passing through the magnet coil to reduce the attractive force acting on the armature such an extent that on the current falling below the limiting current the armature immediately falls down again.

By means of the above-mentioned construction it is possible, apart from the immediate switching-off action effected by the maximum current switch which is also provided in most cases, when the current increases excessively to attain the result that when a definite limiting temperature is exceeded even in the case of only a slight increase of the normal permanent load current, for instance by 5%, the motor is automatically switched off and that nevertheless the heated motor can still be further used with a load less than the normal current, and in which case also transient overloads such as are unavoidable on starting, for example, are carried without the circuit being switched off. For this reason, which is of importance particularly for motors having an intermittent load, such as, for example, in the case of vehicles and lifts, it is possible to utilize the motors to an extent hitherto unattained without them being endangered. Finally, it is also to be recommended to take a solder, for the thermal safety device employed to lock the releasing device, the melting point of which lies between 75° and 80° C., that is, at a temperature which agrees as accurately as possible with the permissible limiting temperature for the winding of electrical machines. In this way the result is obtained that the protective device as the temperature of the room rises becomes correspondingly more sensitive, in contradistinction to such protective devices as work with heat-wires or other materials which do not become effective except at a comparatively high temperature and are consequently less dependent on the room temperature.

An embodiment of the invention is represented by way of example in the accompanying drawings, in which:—

Figure 1 is a vertical section of a protective device constructed in accordance with the invention.

Figure 2 is a plan view thereof.

Figure 3 is a diagram of the device shown in Figures 1 and 2 showing the circuit connections and the time-relay device.

In the example shown I provide a circuit controller or protector comprising an electromagnetic switching device A and a thermally controlled locking and releasing device B. The electromagnetic switching device A consists of an ironclad or pot electromagnet the core or armature 40 of which is influenced by a series coil 41 and by a bucking coil 42. The magnet core or armature 40 is connected by a transverse pin 43 with a contact-lever 45 which turns on the pin 44 and which carries at its free end a contact-plate 68 cooperating with the fixed contact 69. The magnet armature 40 is subjected to the action of a compressed spring 46 which tends to keep the armature and contact-lever in the raised position illustrated. The pressure of the spring 46 can be regulated by a nut 47 and thus the magnet can be roughly adjusted while fine adjustments can be made by means of the screw 48 on the bottom of the coil which screw serves as a counter-core or opposing core. The armature 40 is normally locked in the raised position shown by means of a pin 50 subjected to the action of a spring 49, which pin for its part is connected by a cross-piece 51 and rods 52 with a lever 54 which turns on the pivot 53, said pin 50 being influenced by the thermal releasing device through said rods.

The heat releaser essentially comprises a thin-walled brass sleeve 57 and a rod 58 guided in the sleeve and provided at the lower end with an enlarged portion 70. The sleeve is guided in the center tube 56 of the heat coil 55 and is influenced by a pressure spring 60 resting on the bottom of the center tube, and designed to urge the sleeve upwardly. The rod 58, likewise, is influenced by a pressure spring 59, seated in the tube 57 and tending to force the rod upwardly. The spring 59 is weaker than spring 60, so that it can readily be compressed by spring 60. The rod portion 70 is normally soldered in the position shown in Fig. 1 to the sleeve 57, when the spring 59 is free from pressure or in an expanded condition. The sleeve 57 is normally held in the shown position (lower end position) by the spring 60 being stressed. This is obtained by a locking pawl 54, fulcrumed to a fixed bracket part at 53, and whose nose coacts with a stud 61 on the rod 58. The sleeve, then, is held through the intermediary of rod 58 and the solder joint, so that the sleeve, on the solder joint being fused, is released and is then moved upwardly by the spring 60.

The sleeve 57 is provided at its upper end with a flange 71, designed to coact with an inclined surface on the pawl 54 in such manner that on upward movement of sleeve 57 the pawl 54 is moved out of its locking position. The unsoldering of the joint thus causes the sleeve 57 to move upwardly and to thereby compress the spring 59, i. e., to stress it, and also to disengage the pawl 54 from the rod 58 so that the latter is released. The rod is now also moved upwardly by the stressed spring 59, to the same extent as the sleeve 57 had previously moved upwardly. In this manner sleeve 57 and rod 58 then will regain their initial relative position, in which they are to be rigidly connected by the hardening solder joint.

After the solder has set the sleeve and the rod can be returned into the original illustrated position by pressure upon the rod knob 62 under tensioning of the spring 60. The parts are then locked by the clicking in of the pawl 54.

The upward movement of sleeve and rod is preferably controlled by stops 72 and 73, respectively.

The movement required for switching movements, or as in the example shown, for releasing the magnet armature 40 may be derived from any part of the thermal releaser, for example, from pawl 54, or from the sleeve 57 or also from the rod 58.

The releasing rod 58 is provided at its upper end with a button 62 serving as a handle and is guided in a passage in the fixed head 63.

65 and 66 respectively designate the trip coil and armature of a time delay device controlling a trip switch A governing the flow of current to the protector and machine to be protected. This switch device A comprises the pivoted switch member $a$ adapted to be held in closed position connecting the current supply leads B, B' by a pivoted detent $b$. The detent $b$ is arranged so as to be engaged and released by the armature 66 when the latter is moved by energization of coil 65, so that the switch $a$ will be moved to open position by a spring $c$. Switch $a$ and detent $b$ are set by hand for a circuit closing action, as will be readily understood. A main switch $B^2$ may be provided in the current supply leads between the protector and machine and the source of supply of current for manually letting on and cutting off the flow of current as desired.

The mode of operation of this device is briefly as follows reference being made to the diagram of connections, Fig. 3:—

The arrowed mains are in series with the circuit to be protected. Current enters the heating coil 55 and then traverses the magnet coil 41, the armature 40 of which is held in its raised position by means of the locking pin 50 as long as it is not released by the thermal releasing device. The armature 40 is released under the action of the strong spring 60 after the soldered joint at 70 has become softened, through the pressure of which spring 60 the detent 54 is retracted or moved outward in the direction of the arrow and forces the pin 50 outward to armature releasing position. The sucking-in coil 41 then comes into action and the contacts 68, 69 now come into contact with one another so that now an auxiliary current flows through the demagnetizing coil 42 and through the coil 65 of the retarding or time releasing device 66. By such means the time delay device is set in action so that, after the expiration of a predetermined time period, it will retract the detent $b$ and release the trip switch $a$ which will be moved to cut off the flow of current to the protector and the machine protected thereby. If nevertheless there takes place during the time period of motion of the time releasing device a return of the current-strength below such a value, which for example may be 10% below the permanent load current, at which the coil 41 would still just hold the armature, then the armature 40 returns to normal position, the contacts 68, 69 are opened and the coil of the time releasing device is again made dead so that a switching off of the current by means of the cut-out switch or device A cannot come into effect. As can be seen from the diagram of connections, the weakening of the magnet system for the holding action of the armature takes place automatically as soon as attraction has occurred.

It will be evident that the whole device is not sensitive as long as the soldered joint at 70 has not become soft. In this position the collar 61 lies against the nose of the lever 54, and the armature 40 with the contact lever 45 is held in the raised position by means of the locking member 50 so that the contact plate 68 cannot make contact with the contacts 69. In this position the protective device permits every practically possible overload since an overload is limited only by the adjusted releasing value of the maximum cut-out, that is, the connected current consumer can be utilized up to a limit, which for example is determined by the maximum moment of rotation or the action of a collector, of slip rings and so on. Nevertheless at the instant at which the soldered joint at 70 softens the casing 57 is raised under the action of the powerful spring 60, the weaker spring 59 at first being somewhat compressed. On the casing 57 moving upwards the latter presses with its upper edge against the locking tooth of the locking lever 54 and moves it in the direction of the arrow. Thereby the locking piece 50 for locking the armature 40 is also released so that now the armature is drawn downward under the action of the sucking-in coil 41 and in opposition to the action of the spring 46 and simultaneously the contact lever 45 is moved downwards so that the contact bridge 68 makes contact with the contacts 69. By these means the switching in of the bucking coil 42 and of the coil 65 of the time delay device is effected, so that now after the expiration of the time set the operation of switching off can take place at the maximum cut-out. The action of switching off arrests the excitation of all the coils so that the armature and the switch lever of the time delay device and so on can return into their positions. The relay however, remains sensitive until cooling has proceeded so far that the setting of the solder is again possible.

The soldering pin or rod 58 may be forced back into normal position by pressure on the button 62 and in order that it may again be soldered firmly in the correct position the locking lever 54 is reset into engagement with the collar 61 on the rod so that under the action of the spring 59 the rod can be moved upwards as far upward in the passage in the head 63 as the lever 54 permits. In this position re-soldering automatically takes place in the correct position on the thermal coil cooling down. On account of the rod 58 projecting the danger due to excessive heating can readily be made recognizable externally. Even in the event of the rod 58 being held down by manual pressure applied to the button 62 while the soldered joint is still soft, the device will still be in condition for a control action, since the spring 59 in such case will be compressed without interfering with the action of the spring 60, which raises the casing 57 independently of the rod, so that said casing will hold the locking lever 54 retracted, leaving the armature to be attracted by its coil. If cooling down has proceeded so far that the soldered parts are again held fast in the correct position, movement of rod 58 to position to bring the collar 61 of the rod again under the nose of the lever 54, will cause the rod and lever to be held fast in position by the return spring 49 of the locking piece 50. The core or armature 40 of the magnetic system is now locked again and it is possible as at the commencement for overloads to occur up to the determined limit.

The adjustment of the magnet armature 40 is suitably effected by it being attracted at a current-strength which amounts to about 90% of the permanent load current. In consequence of the arrangement of the time relay additional overload shocks are moreover possible to a great extent even after the soldered joint has softened provided that the duration limited by the time releasing device is not exceeded. Thus if within this permissible time the current decreases to an amount below 90% of the permanent current, the armature 40 returns back into its raised position, the contact lever 68 being also driven with it. The opportune renewed release of the armature 40 is essentially effected by the arrangement of the bucking coil 42 which after the attraction of the armature has been effected is automatically switched into the circuit and supplies flux in opposition to the flux passing through the coil 41 to reduce the attractive force of the latter acting on the armature 40 so that the armature will be held very lightly in attracted position. Consequently whereas in the case of the relays hitherto in use a falling off of the current to almost nil is necessary, in the use of the present relay the return into position of rest takes place on the occurrence of an only slight fall below the strength of current necessary for attraction.

The above described constructional example of the protective device renders it possible to utilize to an extent hitherto unattained electrical machines, and in particular motors, by providing effective protection against excessive heating while allowing the possibility of overload necessary in practice both on starting and also during running. Of course the invention is not limited to the example represented since other constructional forms are possible. In particular, the device is not only capable of being used as shown for continuous current but with suitable modifications also for other kinds of current. Further, the amounts given for the regulation of the current, as for example, 90% of the normal permanent load current are not to be used for every case but if desired are to be so varied that the additional heatings resulting in practice in consequence of load shocks are balanced by a suitable reduction of the current strength.

I claim:—

1. A thermal locking and releasing device comprising a sleeve, a rod guided in said sleeve and normally connected therewith by a fusible joint, a spring acting on the rod to move it in releasing direction on the fusion of the fusible joint, a second spring of greater strength than the first-named spring acting on the sleeve to move the sleeve in the direction of the releasing movement of the rod, and a locking device for normally holding the rod against movement in releasing direction and adapted to be retracted by the pressure of the springs on the fusion of the fusible joint.

2. A thermal locking and releasing device comprising a stationary sleeve, a sliding sleeve in the stationary sleeve, a rod guided in the sliding sleeve and normally connected therewith by a fusible joint, a spring between the rod and sliding sleeve operative to move the rod in releasing direction upon the fusion of the joint, a second spring of greater strength than the first-named spring acting on the sliding sleeve to move it in the same direction, and a locking device engageable with the rod to hold it in normal position and adapted to be retracted by movements of the rod or sliding sleeve in the releasing direction on the fusion of the fusible joint.

3. In a thermoelectric current controller, the combination of a circuit controlling switch, an electromagnetic switch actuating device including a magnet coil and a switch actuating armature influenced thereby, a thermally controlled locking and releasing means for said switch actuating device, a time delay device in the circuit controlled by the switch, and a bucking coil in said circuit controlled by the switch and thrown into action with the time delay device on the closing of the switch upon the release of said switch actuating device for supplying a flux opposing the flux through the magnet coil to reduce the attractive force of the latter on the armature.

4. In a thermoelectric current controller, the combination of an electromagnet coil, an armature actuated thereby, a heating coil, a spring actuated releasing rod normally locked by a soldered joint adapted to be fused by the heating up of the heating coil to unlock said rod for releasing movement, armature locking and releasing means controlled by the rod, a time delay device, a bucking coil for supplying an opposing flux to the flux through the electromagnetic coil to reduce the attractive force of the latter on the armature, and a switch operative when the armature is actuated by excitation of the electromagnet coil to throw said time delay device and bucking coil into action.

5. In a thermoelectric current controller, a switch, an electromagnetic device for actuating said switch including a coil and a switch controlling armature actuated thereby, a thermoelectric means for locking said switch actuating device from action and releasing it for action, time controlled cut-out means thrown into action upon the actuation of said switch by said switch actuating device, and means thrown into action with said time controlled cut-out means for reducing the attractive force of the coil on the armature.

6. Protective device as claimed in claim 3, in which the time delay device includes an electromagnetic coil energized simultaneously with the bucking coil when the switch is closed.

7. Thermal protective device as claimed in claim 3, in which the circuit time delay device includes an electromagnetic coil arranged in series with the bucking coil in the circuit closed by the switch.

8. Protective device as claimed in claim 3 having a thermal releasing device consisting of two members slidably connected with one another by means of a soldered joint, two springs of different strengths, the stronger spring acting when the soldered joint becomes fused to move one of said members in the releasing direction, while compressing the weaker spring against the other member to cause said weaker spring to move said latter member in the releasing direction, and a locking device normally engaging said latter member and retractible by the movement of the same in the releasing direction.

9. A thermoelectric controller for electric circuits, comprising an electromagnetic current controlling device including a magnet coil and an armature movable thereby, heat influenceable means for locking and releasing the armature, a time delay device set into action by said current controller upon the release of the releaser armature, and means operative on release of the releaser armature for reducing the attractive force of the flux through the magnet coil on the releaser armature.

10. A thermoelectric controller for electric currents, comprising an electromagnet coil, an armature influenced by said coil, heat influenced means for locking and releasing the armature, an electromagnetic time delay device, a cut-out governed thereby, a bucking coil for sending a flux in opposition to the flux passing through the electromagnet coil to reduce the attractive force of the latter on the armature, and a switch operative by the release of the armature to simultaneously energize the time delay device and the bucking coil.

11. A thermoelectric controller for electric circuits, comprising an electromagnet coil, an armature influenced by the coil, a heat coil, a releaser for locking and releasing the armature, said releaser being normally held in armature locking position by fusible means adapted to be fused at a predetermined temperature by the action of the heat coil and operative upon the fusion of said fusible means to release the armature for movement under the action of the electromagnet coil, an electromagnetic time delay device set into action on the armature being retracted after its release by the releaser for operating a cut-out, and a bucking coil set into action on the armature being attracted immediately after the latter has been released by the releaser to send an opposing flux to the flux passing through the electromagnetic coil to reduce the attractive force of the latter on the armature.

12. A thermoelectric controller for electric circuits comprising an electromagnet coil, an armature influenced by the coil, a heat coil, a releaser for locking and releasing the armature, said releaser including a latch and a latch releasing device, said device comprising two concentric slidably movable members, one having a latch releasing action, said members being normally held fixed with relation to each other by fusible material, fusible at a predetermined temperature by the action of the heat coil, a comparatively strong spring acting on the other of said members to move both members when united by the fusible means in the direction of latch releasing movement of the first-named member, and a relatively weaker spring interposed between said members and normally held compressed when the members are fixed by the fusible material, said weaker spring being adapted on the fusion of said material to move said members in opposite directions and coacting with the first-named spring to impart further movement to the first-named member in its latch releasing direction of movement.

13. A thermoelectric protective device comprising a protecting circuit having cut-out means therein, a switch for closing said circuit, a thermoelectric locking and releasing device for normally locking the switch from closing action and operative at a predetermined temperature for releasing the switch for closing action, an electromagnetic device for closing the switch when released for action by the locking and releasing device and holding the switch closed, and means for reducing the holding force of said electromagnetic switch closing device on the switch after the switch is closed thereby.

14. A thermoelectric protective device for electrically operated elements comprising a control circuit, a time delay device in said circuit for causing a working action of suitable current control means within a given period of time, a normally open switch for closing said circuit and thereby effecting the actuation of said time delay device, a thermostatic locking and releasing device for normally locking the switch from closing movement and operative at a predetermined temperature for releasing the switch for closing movement, and an electromagnetic device for closing the switch when released for closing movement by said locking and releasing device.

In testimony whereof I affix my signature.

OTTO DREYER.